US009226212B2

(12) United States Patent
Miki et al.

(10) Patent No.: US 9,226,212 B2
(45) Date of Patent: Dec. 29, 2015

(54) WIRELESS COMMUNICATION DEVICE AND METHOD FOR HANDOVER IN WIRELESS COMMUNICATION NETWORKS

(75) Inventors: Tomohiro Miki, Yokohama (JP); Tomoyoshi Yokota, Yokohama (JP)

(73) Assignee: Kyocera Corporation, Kyoto (JP)

( * ) Notice: Subject to any disclaimer, the term of this patent is extended or adjusted under 35 U.S.C. 154(b) by 1278 days.

(21) Appl. No.: 12/507,649

(22) Filed: Jul. 22, 2009

(65) Prior Publication Data

US 2010/0022246 A1    Jan. 28, 2010

(30) Foreign Application Priority Data

Jul. 24, 2008    (JP) .................................. 2008-190830

(51) Int. Cl.
*H04W 36/24* (2009.01)
*H04W 52/02* (2009.01)

(52) U.S. Cl.
CPC .......... *H04W 36/24* (2013.01); *H04W 52/0274* (2013.01); *Y02B 60/50* (2013.01)

(58) Field of Classification Search
CPC .......................... H04W 36/24; H04W 52/0274
USPC ................ 455/436, 437, 438, 443, 444, 13.4, 455/127.5, 343.2, 343.3, 343.4, 552, 574; 340/7.32, 7.33, 7.36, 7.37; 370/311, 370/318, 331, 332
See application file for complete search history.

(56) References Cited

U.S. PATENT DOCUMENTS

| | | | |
|---|---|---|---|
| 6,212,382 B1 * | 4/2001 | Watson et al. | 455/444 |
| 2002/0173303 A1 | 11/2002 | Shibutani | |
| 2005/0094589 A1 * | 5/2005 | Camp | 370/318 |
| 2006/0203755 A1 * | 9/2006 | Kim | 370/311 |
| 2007/0142098 A1 * | 6/2007 | Behzad et al. | 455/574 |
| 2008/0026718 A1 * | 1/2008 | Wangard et al. | 455/266 |
| 2008/0287080 A1 * | 11/2008 | Camp et al. | 455/127.5 |
| 2008/0318580 A1 * | 12/2008 | Zhong et al. | 455/444 |

FOREIGN PATENT DOCUMENTS

| | | |
|---|---|---|
| JP | 9-322222 | 12/1997 |
| JP | 2002-374578 | 12/2002 |
| JP | 2004-015192 | 1/2004 |
| JP | 2005-295332 | 10/2005 |
| JP | 2005-328426 | 11/2005 |
| JP | 2007-274152 | 10/2007 |
| JP | 2008-011452 | 1/2008 |

* cited by examiner

*Primary Examiner* — Anthony Addy
*Assistant Examiner* — Edd Rianne Plata
(74) *Attorney, Agent, or Firm* — Duane Morris LLP

(57) ABSTRACT

A communication terminal device and method operable to control a handover is disclosed. A connection is made to a first wireless communication network. If occurrence of a handover factor is detected, a search is made for a second wireless communication network based on a detection order, and handoff is made.

16 Claims, 4 Drawing Sheets

WIRELESS COMMUNICATION DEVICE AND METHOD FOR HANDOVER IN WIRELESS COMMUNICATION NETWORKS

CROSS-REFERENCE TO RELATED APPLICATION

The present application claims priority under 35 U.S.C. §119 to Japanese Patent Application No. 2008-190830, filed on Jul. 24, 2008, entitled "WIRELESS COMMUNICATION TERMINAL DEVICE". The content of which is incorporated by reference herein in its entirety.

FIELD OF INVENTION

Embodiments of the present invention relate generally to wireless communication terminal devices, and more particularly relate to a multi-mode wireless communication terminal devices.

BACKGROUND OF THE INVENTION

A multimode wireless communication terminal device may comprise a plurality of wireless communication units for different wireless communication networks. The multimode wireless communication terminal device may communicate with a first wireless communication network using a first wireless communication unit, while a second wireless communication unit searches for a second wireless communication network to designate as a candidate network for a handover. When a handover factor (e.g., low signal to noise ratio) occurs, a handover is executed from the first wireless communication network to the second wireless communication network. The multimode wireless communication terminal device executes a handover after the second wireless communication unit establishes a network link to the second wireless communication network. As a result, a seamless handover can be realized without an interruption of communication.

However, power is continually supplied to the second wireless communication unit even when it is not performing communication with any communication network. Also, even when no handover factor occurs, the second wireless communication unit searches for a wireless communication network to become a handover destination, which causes excessive power consumption. As a result, available battery time is shortened.

In addition, a transmission power of the wireless communication terminal device is generally controlled in accordance with a communication status of a corresponding base station. Also, a set value of the transmission power is generally high in a fringe area where a handover factor occurs. Furthermore, an area near the fringe area where a handover factor occurs is often an area near a fringe area for a base station of another wireless communication network where the multimode wireless communication terminal device can execute a handover. In that case, the multimode wireless communication terminal device searches for a candidate base station to be a handover destination while power is continually supplied to one or more wireless communication units that may not be performing communication with any communication network. Furthermore, in an attempt to register its position, the multimode wireless communication terminal device transmits device and other related registration information at high transmission power from the one or more wireless communication units to the candidate base station. Accordingly, a large amount of power is used in the plurality of wireless communication units until the handover is completed. As a result, the amount of power used increases, which causes further exhaustion of the battery.

Therefore, there is a need for a wireless communication terminal device operable to execute a handover between different wireless communication networks with less exhaustion of a battery.

SUMMARY

A communication terminal device and method operable to control a handover is disclosed. A connection is made to a first wireless communication network. If occurrence of a handover factor is detected, a search is made for a second wireless communication network based on a detection order, and handoff is made.

A first embodiment comprises a communication terminal device. The device comprises a plurality of wireless communication units each comprising a receiver and a transmitter, and each operable to communicate with a corresponding wireless communication network. The device further comprises a handover factor detecting unit operable to detect an occurrence of a handover factor when one of the wireless communication units communicates with a corresponding wireless communication network. The device further comprises a storage unit operable to store a detection order for a handover between different wireless communication networks, and a power supply unit operable to provide power to each of the wireless communication units. The device also comprises a controller operable to control the power supply unit to provide power to a first unit of the wireless communication units to allow the first unit to perform a communication with a first wireless communication network, if a receiver of the first unit detects the first wireless communication network. The controller is further operable to control the power supply unit to provide power to a second unit of the wireless communication units based on the detection order, if the handover factor detecting unit detects occurrence of the handover factor during the communication. The controller then performs a handover from the first wireless communication network to a second wireless communication network corresponding to the second unit.

A second embodiment comprises a method for performing handover from a wireless communication network to another. The method comprises establishing a communication with a first wireless communication network, and detecting occurrence of a handover factor during the communication with the first wireless communication network. The method further comprises detecting a second wireless communication network from one or more wireless communication networks different from the first wireless communication network based on a detection order of the one or more wireless communication networks, if occurrence of the handover factor is detected, and performing handover from the first wireless communication network to the second wireless communication network.

BRIEF DESCRIPTION OF THE DRAWINGS

Embodiments of the present invention are hereinafter described in conjunction with the following figures, wherein like numerals denote like elements. The figures are provided for illustration and depict exemplary embodiments of the invention. The figures are provided to facilitate understanding of the invention without limiting the breadth, scope, scale, or applicability of the invention. The drawings are not necessarily made to scale.

DETAILED DESCRIPTION OF EXEMPLARY EMBODIMENTS

The following detailed description is exemplary in nature and is not intended to limit the invention or the application and uses of the embodiments of the invention. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the invention. Furthermore, there is no intention to be bound by any expressed or implied theory presented in the preceding technical field, background, brief summary or the following detailed description. The present invention should be accorded scope consistent with the claims, and not limited to the examples described and shown herein.

Embodiments of the invention are described herein in the context of practical non-limiting applications, namely, power saving in a mobile device such as a cell phone. Embodiments of the invention, however, are not limited to such mobile device applications, and the techniques described herein may also be utilized in other terminal device applications. For example, embodiments may be applicable to a computer, a Personal Digital Assistant (PDA), or a GPS system.

As would be apparent to one of ordinary skill in the art after reading this description, these are merely examples and the embodiments of the invention are not limited to operating in accordance with these examples. Other embodiments may be utilized and structural changes may be made without departing from the scope of the exemplary embodiments of the present invention.

The following description is presented to enable a person of ordinary skill in the art to make and use the embodiments of the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the embodiments of the present invention. Thus, the embodiments of the present invention are not intended to be limited to the examples described herein and shown, but are to be accorded the scope consistent with the claims.

Figure 1:
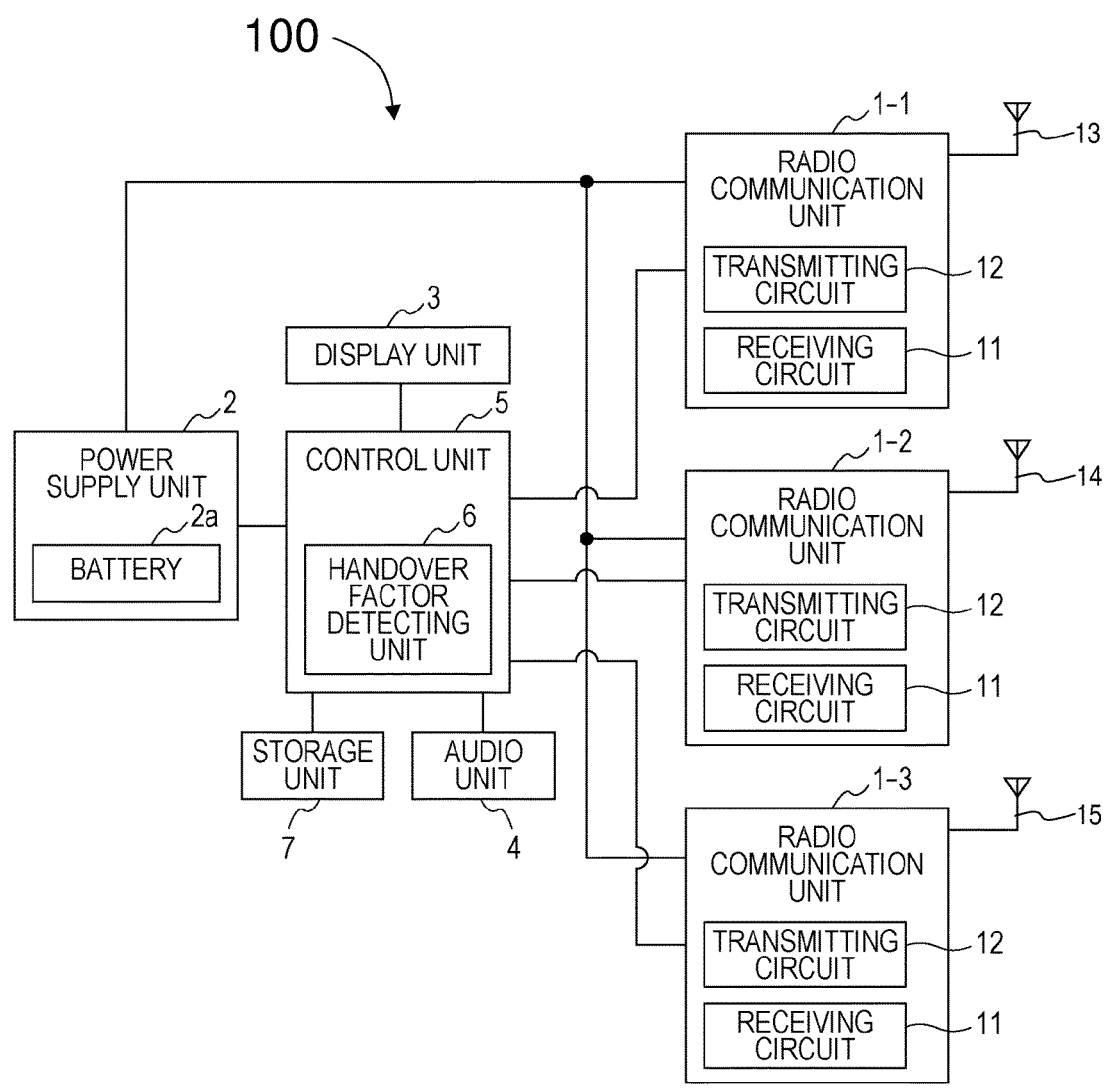
FIG. 1 illustrates a schematic system block diagram of an exemplary communication terminal device according to an embodiment of the invention.

FIG. 1 illustrates a schematic system block diagram of an exemplary mobile phone 100 (terminal device 100) according to an embodiment of the invention. The mobile phone 100 may generally comprise: a plurality of wireless communication units such as a first wireless (radio) communication unit 1-1, a second wireless communication unit 1-2, and a third wireless communication unit 1-3. The mobile phone 100 may further comprise a power supply unit 2, a display unit 3, an audio unit 4, a control unit 5 (controller 5) and a storage unit 7. The power supply unit 2 may comprise a battery 2a which supplies power to the wireless communication units 1-1, 1-2, and 1-3 in accordance with instructions from the control unit 5.

The wireless communication units 1-1, 1-2, and 1-3, each may comprise a receiving circuit 11 (receiver 11) and a transmitting circuit 12 (transmitter 12), and are configured to wirelessly connect to various wireless communication networks. The wireless communication units 1-1, 1-2, and 1-3, are each operable to transmit and receive a plurality of communication signals via the receiver 11 and the transmitter 12. The wireless communication units 1-1, 1-2, and 1-3, are each also operable to carry out a radio communication with a network side device via the wireless communication network (not shown). The network side device may include a plurality of access points or base stations communicatively coupled to the wireless communication network. The wireless communication units 1-1, 1-2, and 1-3 communicate with a base station transceiver, and transmits and/or receives various kinds of data such as voice data during a voice call, mail data during transmitting/receiving mail, and web page data during webpage browsing via a wireless data communication link (not shown). Each of the wireless communication units 1-1, 1-2, and 1-3 cooperates with the base station transceiver with a suitably configured RF antenna arrangement 13-15 that can support a particular wireless communication protocol and modulation scheme. The wireless communication protocols may comprise, for example, but without limitation, CDMA, WiMAX, PHS, radio LAN (WiFi: IEEE802.11), LTE, GMS, IS56/IS136, and the like. Also, more than one of the wireless communication units 1-1, 1-2, and 1-3 may communicate using a wireless communication protocol, but communicate with different wireless communication networks operated by different communication companies.

The wireless communication units 1-1, 1-2, and 1-3 may be placed in the terminal device 100 after an optimization for different wireless communication networks. Alternatively, at least one of the wireless communication units 1-1, 1-2, and 1-3 may be attachable/detachable to the terminal device 100 via an interface. The wireless communication units 1-1, 1-2, and 1-3 may be compatible with various wireless communication networks such as software radio. Any number of wireless communication units may be used.

The display unit 3 may comprise an image display device such as, without limitation, a light emitting diode (LED) display, a liquid crystal display (LCD), or an organic EL display (OLED). The display unit 3 may be used to display an image corresponding to images provided by the control unit 5.

The audio unit 4 applies signal processing to digital voice data supplied from the control unit 5. The audio unit 4 inputs/outputs voice signals for voice communication and outputs downloaded audio signals. The audio unit 4 performs decoding, digital/analogue conversion, and amplification, of the digital voice data to convert it into an analogue voice signal for output to a speaker (not shown).

The control unit 5 may control transmitting/receiving of signals by the radio communication units 1-1 to 1-3, control power provided from the power supply unit 2 to the wireless communication units 1-1, 1-2, and 1-3, etc. The control unit 5 may control operations of the mobile phone 100 so that processes of the mobile phone 100 are suitably performed. These processes may include, without limitation, voice communication performed over a line switching network, composing and transmitting/receiving e-mail, browsing web sites on the Internet, and the like. The control unit 5 may comprise a computer (microprocessor) or another processor for performing a process based on a program (operating system, application program, etc.) stored in the storage unit 7. The control unit 5 may read instruction code sequentially from programs such as the operating system and the application program which are stored in the storage unit 7, and perform the programs.

The control unit 5 may comprise a handover factor detecting unit 6 to detect occurrence of a handover factor in a wireless communication network in a communication status report. The handover factor detector 6 detects occurrence of a handover factor in a wireless communication network according to an embodiment of the invention. A handover factor occurs, for example, but without limitation, when, received signal strength at the communication terminal device 100 (mobile device 100) is lower than a threshold.

The storage unit 7 is operable to store various kinds of data used for various processes of the mobile phone 100. In practical embodiments, the storage unit 7 may comprise, for example, a non-volatile memory or storage device (non-volatile semiconductor memory, hard disk device, optical disk device, and the like), a random access storage device (for example, SRAM, DRAM), or any other form of storage medium known in the art. For example, the storage unit 7 may store a computer program which is executed by the control unit 5, an address book for managing personal information such as telephone numbers and e-mail addresses, an audio file for reproducing a ring tone and alarm tone, an image file for a standby screen, various kinds of setting data, a temporary data used in a program process, a detection order, power consumption characteristics in the respective wireless communication networks, and the like. The storage unit 7 may be coupled to the control unit 5 such that the control unit 5 can read information from and write information to storage unit 7. As an example, the control unit 5 and storage unit 7 may reside in their respective ASICs. The storage unit 7 may also be integrated into the control unit 5. In an embodiment, the storage unit 7 may include a cache memory for storing temporary variables or other intermediate information during execution of instructions to be executed by the control unit 5. The storage unit 7 may use the non-volatile memory for storing instructions to be executed by the wireless communication units 1-1 to 1-3.

Figure 2:
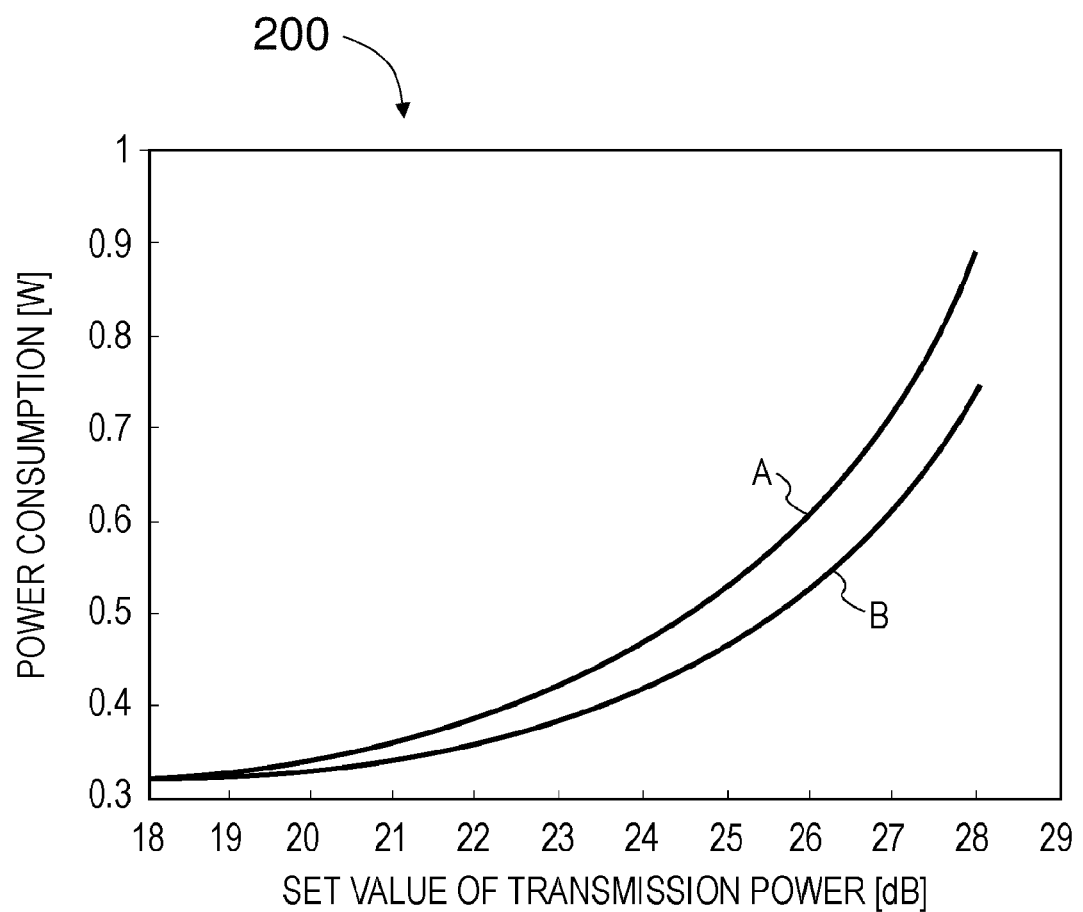
FIG. 2 is an exemplary graph illustrating power consumption characteristics as a function of set values of transmission power in two wireless communication units each utilizing a different wireless communication protocol.

FIG. 2 illustrates a power consumption characteristic A for a wireless communication unit A (device A), and a power consumption characteristic B for a wireless communication unit B (device B) as a function of their set values of transmission power. Each of devices A and B may use different modulation techniques and usable frequency bands based on their respective communication protocols. Thus a power consumption value may also be different even when a set value of transmission power may be the same. FIG. 2 shows that, power consumption is higher (curve A) for communication in a wireless communication network using the device A than for communication in a wireless communication network using the device B (curve B).

Therefore, if a handover factor occurs during the communication in the wireless communication network using the device B (lower power consumption) and if a handover to the wireless communication network using the device A (higher power consumption) is executed, with power being continually supplied to devices A and B, a power consumption value increases and the amount of power used further increases. Accordingly, the available battery time could be further shortened.

In the mobile phone 100 according to an embodiment of the invention, power is provided to one of the wireless communication units 1-1, 1-2, and 1-3 at the start of a wireless communication. The power is provided based on a predetermined value. For example, the control unit 5 controls power supply from the power supply unit 2 to the wireless communication units 1-1, 1-2, and 1-3 so as to provide power to the first wireless communication unit 1-1 at the start of communication. Accordingly, the first wireless communication unit 1-1 supplied with power, wirelessly connects to a corresponding wireless communication network, thereby executing communication, such as a voice call or transmission/reception of data.

When occurrence of a handover factor is detected by the handover factor detecting unit 6 during the communication, the control unit 5 controls execution of a handover by controlling the supply of power to the second and third wireless communication units 1-2 and 1-3.

Figure 3:
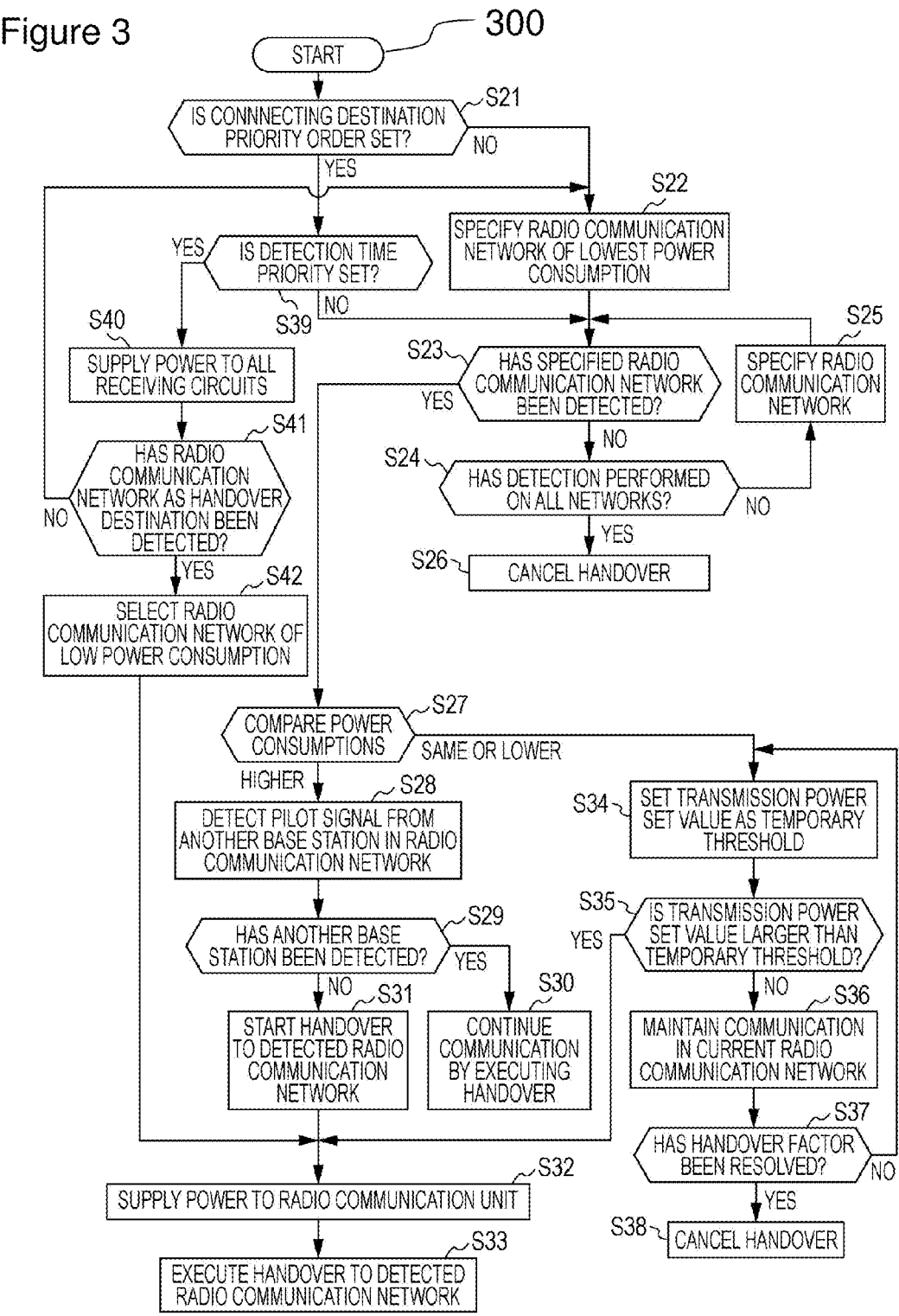
FIG. 3 is a flowchart illustrating an exemplary hand over detection process according to an embodiment of the invention.

FIG. 3 is a flowchart illustrating an exemplary handover factor detection process 300 according to an embodiment of the invention. The various tasks performed in connection with process 300 may be performed by software, hardware, firmware, or any combination thereof. For illustrative purposes, the following description of process 300 may refer to elements mentioned above in connection with FIGS. 1-2. In practical embodiments, portions of process 300 may be performed by different elements of the described device, e.g., the power supply unit 2, the storage unit 7, the control unit 5, the handover factor detecting unit 6, and wireless communication systems 32-1, 32-2, and wireless communication units 1-1 to 1-3. Process 300 may include any number of additional or alternative tasks. The tasks shown in FIG. 3 need not be performed in the illustrated order, and process 300 may be incorporated into a more comprehensive procedures or processes having additional functionality not described in detail herein.

In this example, process 300 detects the handover factor via the handover detecting unit 6 based on the following assumptions: 1) the wireless communication terminal device supplies power to the wireless communication unit corresponding to the wireless communication network where communication is currently being performed before occurrence of the handover factor, and 2) power consumption order is set as detection order.

Detection order may be based on, for example and without limitation, a connecting destination priority order and detection time priority set by a user in accordance with a usage contract for different wireless communication networks. Regarding the power consumption order, lower power consumption is at higher priority. That is, lower order refers to higher priority while higher order refers to lower priority.

In addition, the following description includes cases where connecting destination priority order is set and is not set. As the connecting destination priority order, the user generally specifies order of wireless communication networks in view of connection efficiency and power consumption.

First, when occurrence of a handover factor is detected, the control unit 5 determines whether the connecting destination priority order is set by accessing the content of the storage unit 7 (step S21).

If the connecting destination priority order is not set, the control unit 5 specifies the wireless communication network of the lowest power consumption (highest priority in order) except the wireless communication network in a communication status report in accordance with the power consumption order stored in the storage unit 7 (step S22). Process 300 then allows the power supply unit 2 to provide power to the receiver 11 of the corresponding wireless communication unit, thereby determining whether a pilot signal (annunciation signal) from the base station of the wireless communication network has been received, i.e., whether the wireless communication network has been detected (step S23). Alternatively, supplying power in step S23 may be limited to a predetermined time period. The predetermined time period to provide power to the receiver 11 of the wireless communication unit may be a minimum time period when the pilot signal from the base station of the corresponding wireless communication network can be received.

If it is determined in step S23 that the specified wireless communication network has not been detected, the control unit 5 stops supplying power to the receiver 11 (step S24). The control unit 5 then sequentially specifies wireless communication networks in ascending order of power consumption order in step S25, supplies power from the power supply unit 2 to the receiver 11 of the corresponding wireless communication unit for the predetermined time period in accordance with the specification, and determines whether the specified wireless communication network has been detected. As a result, if it is determined in step S24 that detection has been performed on all the other wireless communication networks, the control unit 5 determines that a handover destination is not found and cancels the handover (step S26).

If it is determined in step S23 that the specified wireless communication network has been detected, the control unit 5 compares the power consumption in the wireless communication network in the communication status report with the power consumption in the detected wireless communication network (step S27).

As a result, if the power consumption order in the wireless communication network detected (candidate network) in step S23 is higher than the power consumption order in the wireless communication network where communication is being performed (current network), the control unit 5 executes detection of a pilot signal from another base station in the current network (step S28) and determines whether another base station has been detected (step S29). If the other base station has been detected, the control unit 5 continues communication by executing a handover to the other base station in the same detected wireless communication network until a new handover factor occurs (step S30).

On the other hand, if it is determined in step S29 that another base station does not exist, a handover in the wireless communication network where communication is being performed is not executed, and thus the control unit 5 starts a handover to the other wireless communication network detected in step S23 (step S31). For this purpose, the control unit 5 controls the power supply unit 2 in order to provide power to the receiver 11 and the transmitter 12 of the wireless communication unit corresponding to the other wireless communication network as a handover destination. The control unit 5 then establishes a wireless communication link to the other wireless communication network corresponding to the wireless communication unit through radio a channel (step S32). Accordingly, the control unit 5 executes a necessary process including position registration to the other wireless communication network and executes a handover to the other wireless communication network (step S33). After the handover to the other wireless communication network has been completed, the control unit 5 controls the power supply unit 2 in order to cut off power provided to the wireless communication unit corresponding to the wireless communication network where communication was originally performed.

On the other hand, if it is determined in step S27 that the power consumption order in the wireless communication network detected in step S23 is equal to or lower than the power consumption order in the wireless communication network where communication is being performed, the control unit 5 sets a set value of transmission power set in the transmitter 12 at the occurrence of a handover factor as a temporary threshold (step S34). Then, the control unit 5 determines whether the set value of transmission power currently specified by the base station where communication is being performed is larger than the temporary threshold (step S35).

As a result, if the current set value of transmission power is equal to or smaller than the temporary threshold, i.e., if the set value has not increased, it is estimated (determined) that the wireless communication terminal device is approaching the base station where communication is being performed, and that the radio status is improved. Thus, the control unit 5 does not execute a handover and maintains the communication with the current wireless communication network (step S36), and also monitors whether a handover factor has been resolved (step S37). As a result, if the handover factor has been resolved, the control unit 5 cancels the handover and continues the communication in the current wireless communication network (step S38). If the handover factor has not been resolved, the process returns to step S34, where the control unit 5 changes the temporary threshold to the current set value of transmission power and repeats the above-described operations.

If it is determined in step S35 that the current set value of transmission power is larger than the temporary threshold, it is estimated that the wireless communication terminal device is moving away from the base station where communication is being performed and the radio status is deteriorated. Thus, the control unit 5 performs step S32. Then, the control unit 5 controls the power supply unit 2 in order to provide power to the receiver 11 and the transmitter 12 of the wireless communication unit corresponding to the other wireless communication network as a handover destination. The control unit 5 also controls the power supply unit 2 in order to establish a link to the other wireless communication network corresponding to the wireless communication unit through a radio connection. Accordingly, in the step S33, the control unit 5 executes a handover to the other wireless communication network.

If it is determined in step S21 that the connecting destination priority order is set, the control unit 5 determines whether the detection time priority is set by referring to the content in the storage unit 7 (step S39). As a result, if the detection time priority is not set, the process 300 proceeds to step S23, where the control unit 5 executes detection of a wireless communication network as a handover destination in the same manner as described above in accordance with the set connecting destination propriety order. If it is determined in step S39 that the detection time priority is not set, the process 300 may proceed to step S22 (not shown), where the control unit 5 may execute detection of a wireless communication network as a handover destination in accordance with the power consumption order stored in the storage unit 7.

If it is determined in step S39 that the detection time priority is set, the control unit 5 controls the power supply unit 2 in order to simultaneously provide power to the receiver 11 of all the wireless communication units except the wireless communication unit corresponding to the wireless communication network where communication is being performed for the predetermined time period (step S40), thereby detecting a wireless communication network that can be a handover destination (step S41).

In this manner, if one wireless communication network that can be a handover destination has been detected, the control unit 5 selects the wireless communication network as a handover destination. If a plurality of wireless communication networks that can be a handover destination have been detected, the wireless communication network of the highest connecting destination priority order is selected as a handover destination. On the other hand, if the plurality of detected wireless communication networks is in the same connecting destination priority order, the wireless communication network of low power consumption order (high priority) is selected as a handover destination (step S42). Then, the process proceeds to step S32, where the control unit 5 controls the power supply unit 2 in order to provide power to the receiver 11 and the transmitter 12 of the wireless communication unit corresponding to the wireless communication network selected as a handover destination and to establish a link to the wireless communication network. In step S33, the control unit 5 executes a handover to the wireless communication network.

If it is determined in step S41 that a wireless communication network that can be a handover destination has not been detected, the process proceeds to step S22, where the control unit 5 executes detection of a wireless communication network as a handover destination in the same manner as described above in accordance with the power consumption order stored in the storage unit 7. If it is determined in step S41 that a wireless communication network as a handover destination has not been detected, the process may proceed to step S23 (not shown), where the control unit 5 may execute detection of a wireless communication network as a handover destination in accordance with the set connecting destination priority order.

As described above, the wireless communication terminal device according to the present embodiment executes communication through a wireless communication network corresponding to any one of the wireless communication units 1-1, 1-2, and 1-3 corresponding to different wireless communication networks by supplying power to one of the wireless communication units. When the handover factor detecting unit 6 detects occurrence of a handover factor during the communication, the control unit 5 controls power provided from the power supply unit 2 to another wireless communication unit and controls execution of a handover in accordance with the detection order stored in the storage unit 7. Accordingly, compared to the related art where power may be continually supplied to the wireless communication units that are not performing communication, a handover between different wireless communication networks can be seamlessly executed with lower power. In this manner, the available time of the battery 2a can be extended.

In the case where the power consumption order in different wireless communication networks is used as the detection order, the wireless communication networks as a handover destination are detected in ascending order of power consumption. Thus, a handover to a wireless communication network of low power consumption is more likely to occur, so that the amount of power used can be reduced.

Furthermore, if the power consumption in the wireless communication network detected as a handover destination is equal to or lower than the power consumption in the wireless communication network where communication is being performed, a handover is not immediately executed. Instead, a handover is executed when the current set value of transmission power in the wireless communication network where communication is being performed increases to larger than the set value of transmission power at the occurrence of a handover factor. If the set value does not increase, the handover is not executed. Accordingly, in the case where a handover factor occurs in a fringe area, the wireless communication terminal device approaches a base station from the fringe area, and then a radio status is improved, and a handover can be avoided. Thus, handover efficiency can be enhanced and an increase the amount of power used can be further suppressed. Specifically, assume that a handover factor occurs in a fringe area and that a handover to another wireless communication network is immediately executed. In that case, if the wireless communication terminal device, which is also near the fringe area of the handover destination, approaches the base station of the previous wireless communication network, a handover factor occurs in the handover destination, and a handover to the previous wireless communication network occurs. That is, a plurality of handovers is executed in a short time, which increases the amount of power used.

If the power consumption in the wireless communication network detected as a handover destination is higher than the power consumption in the wireless communication network where communication is being performed, an attempt is made to detect a base station in the handover destination in the wireless communication network where communication is being performed. Then, if the base station is detected, a handover to another wireless communication network of high power consumption is not executed, but a handover is executed within the wireless communication network of low power consumption where communication is being performed. Accordingly, an increase in the amount of power used can be efficiently suppressed.

Furthermore, in the case where the connecting destination priority order is used as the detection order of a wireless communication network that can be a handover destination, another wireless communication network that can be a handover destination is detected in accordance with the connecting destination priority order. Therefore, a handover to a wireless communication network of high connecting destination priority order is enabled in accordance with a desire of a user. Also, if the detection time priority is set together with the connecting destination priority order, whether a handover can be executed is simultaneously determined for all the other wireless communication networks. Thus, a wireless communication network as a handover destination of high connecting destination priority order can be swiftly detected and a handover can be executed. Accordingly, seamless communication can be executed more reliably.

Figure 4:
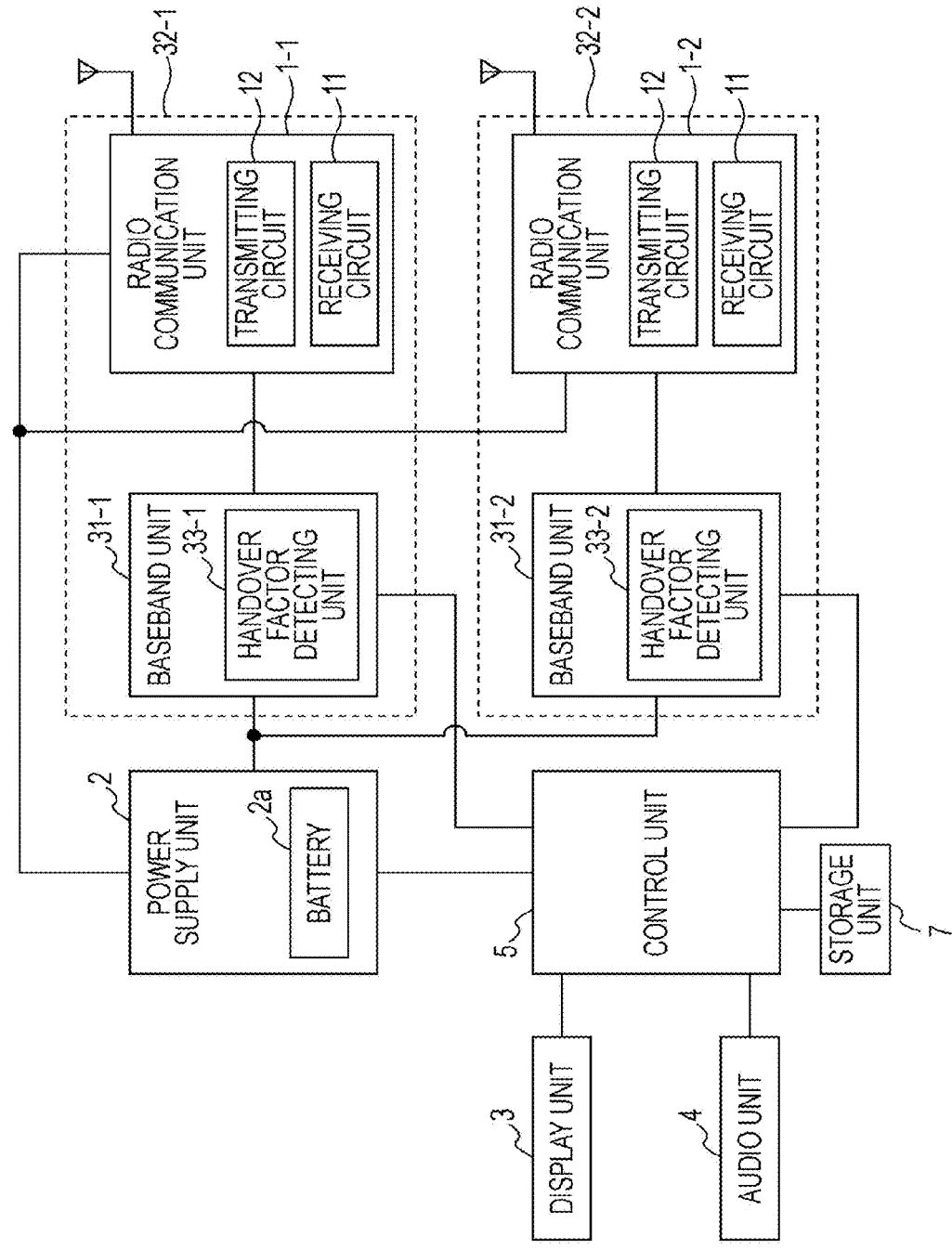
FIG. 4 illustrates a schematic system block diagram of a communication terminal device according to one embodiment of the invention.

FIG. 4 illustrates a schematic system block diagram of a communication terminal device 400 (mobile phone 400) according to an embodiment of the invention. A handover factor detecting unit is included in a wireless system unit as compared to the handover factor detecting unit 6 included in the control unit 5 in the mobile phone 100 illustrated in FIG. 1. In the embodiment shown in FIG. 4, the wireless system unit includes a wireless communication unit and a baseband unit corresponding to the wireless communication unit. In this manner, each of a plurality of wireless system units, include a wireless communication unit and a baseband unit. The mobile phone 400 has functionality and elements that are similar to the mobile phone 100. These common features, functions, and elements will not be redundantly described here. Thus, in FIG. 4 the elements having the same function are denoted by the same reference numerals and the corresponding description is applicable.

The mobile phone 400 may include: a first wireless communication system 32-1 comprising a wireless communication unit 1-1 coupled to a baseband unit 31-1, and a second wireless communication system 32-2 comprising a wireless communication unit 1-2 coupled to a baseband unit 31-2. The baseband units 31-1 and 31-2 comprise handover factor detecting units 33-1 and 33-2 respectively. In practice, baseband units 31-1 and 31-2 may be optimized for different wireless communication networks and coupled internally to the mobile phone 400. Alternatively, at least one of the baseband units 31-1 and 31-2 may be attachable/detachable to the mobile phone 400 via an interface. The wireless communication units 1-1 and 1-2 may be software radios compatible with suitable wireless communication networks respectively. The wireless mobile phone 400 is merely an example of an embodiment of the invention, and other system components may be utilized and structural changes may be made without limitation.

In the wireless mobile phone 400, when occurrence of a handover factor is detected by the handover factor detecting unit 33-1 in the baseband unit 31-1 in the wireless communication system 32-1 where communication is being performed, the control unit 5 controls power provided to the wireless communication unit 1-2 from the power supply unit 2 and controls execution of a handover in accordance with the detection order stored in the storage unit 7. The control unit 5 then controls the power supply unit 2 to provide power to the corresponding baseband unit 31-2 in synchronization with power provided to the receiver 11 and/or the receiver 11 and the transmitter 12 in the wireless communication unit 1-2.

In this manner, the wireless communication terminal device according to the present embodiment controls power provided to the corresponding baseband units 31-1 and 31-2 in synchronization with the operation of the wireless communication units 1-1 and 1-2.

Therefore, excessive supply of power to the baseband units 31-1 and 31-2 can be avoided and an increase in the amount of power used can be effectively suppressed, so that the available time of the battery 2a can be extended.

The embodiments of the invention are not limited to the above-described embodiments, and various modifications or changes can be accepted. For example, in the above-described embodiments, the power consumption order is set as the detection order of a wireless communication network as a handover destination stored in the storage unit 7. However, the connecting destination priority order, or the connecting destination priority order and the detection time priority may be set instead of the power consumption order. In the case where the power consumption order is not set and only the connecting destination priority order is set, the process illustrated in FIG. 3 proceeds from step S39 to step S22, where the control unit 5 executes detection of a wireless communication network as a handover destination in the above-described manner in accordance with the set connecting destination priority order thereafter. As a result, if a wireless communication network as a handover destination is detected, a handover to the detected wireless communication network is executed. Otherwise, the connecting destination priority order is applied instead of the power consumption order, the connecting destination priority order of the wireless communication network where communication is being performed is compared with that of the detected wireless communication network as a handover destination, and execution of a handover is controlled in the same manner as illustrated in FIG. 3 in accordance with the comparison result.

If the power consumption order is not set and the connecting destination priority order and the detection time priority are set, the process illustrated in FIG. 3 proceeds from step S39 to step S40, where the control unit 5 simultaneously supplies power to the receiver 11 of the wireless communication units except the wireless communication unit corresponding to the wireless communication network where communication is being performed for the predetermined time period. As a result, if a wireless communication network that can be a handover destination is detected in step S41, a handover to the wireless communication network of the high connecting destination priority order is executed. If a wireless communication network that can be a handover destination is not detected, the process proceeds to step S23, where execution of a handover is controlled as in the case where only the connecting destination priority order is set.

Furthermore, in the above-described embodiments, the priority is, for example but without limitation, higher in the order of the power consumption order, the connecting destination priority order, and the detection time order.

Although exemplary embodiments of the embodiment of the invention have been described above with reference to the accompanying drawings, it is understood that the embodiment of the invention is not limited to the above-described embodiments. Various alterations and modifications to the above embodiments are contemplated to be within the scope of the embodiments of the invention. It should be understood that those alterations and modifications are included in the technical scope of the embodiments of the invention as defined by the appended claims.

While at least one exemplary embodiment has been presented in the foregoing detailed description, the present invention is not limited to the above-described embodiment or embodiments. Variations may be apparent to those skilled in the art. In carrying out the present invention, various modifications, combinations, sub-combinations and alterations may occur in regard to the elements of the above-described embodiment insofar as they are within the technical scope of the present invention or the equivalents thereof. The exemplary embodiment or exemplary embodiments are examples, and are not intended to limit the scope, applicability, or configuration of the invention in any way. Rather, the foregoing detailed description will provide those skilled in the art with a template for implementing the exemplary embodiment or exemplary embodiments. It should be understood that various changes can be made in the function and arrangement of elements without departing from the scope of the invention as set forth in the appended claims and the legal equivalents thereof. Furthermore, although embodiments of the present invention have been described with reference to the accompanying Tables, it is to be noted that changes and modifications may be apparent to those skilled in the art. Such changes and modifications are to be understood as being included within the scope of the present invention as defined by the claims.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A communication terminal device, comprising:
   a plurality of wireless communication units each comprising a receiver and a transmitter, and each configured to communicate with a corresponding wireless communication network;
   a handover factor detecting unit configured to detect an occurrence of a handover factor when one of the wireless communication units communicates with the corresponding wireless communication network;
   a power supply unit configured to provide power to each of the plurality of wireless communication units;
   a storage unit configured to store a detection order for a handover between different wireless communication networks; and
   a controller configured to:
   control the power supply unit to provide power to a first unit of the plurality of wireless communication units corresponding to a first wireless communication network;
   control the power supply unit to provide power to a second unit of the plurality of wireless communication units, based on the detection order, in order to detect a second network communication network corresponding to the second unit, when the handover factor detecting unit detects an occurrence of the handover factor during communication with a base station in the first wireless communication network, wherein the detection order comprises a power consumption order based on a power consumption of the transmitter in each of the wireless communication units; and
   the controller is further configured to detect the second wireless communication network based on the power consumption order and sequentially specifies wireless communication networks based on the power consumption order and supplies power from the power supply unit to the corresponding wireless communication unit for a predetermined time period;
   determine when a power consumption of the second unit is higher than a power consumption of the first unit, after the second wireless communication network is detected based on the detection order;
   handover from the first wireless communication network to a second wireless communication network, when the power consumption of the second unit is not higher than the power consumption of the first unit; and
   handover from the base station in the first wireless communication network to another base station in the first wireless communication network when the power consumption of the second unit is higher than the power consumption of the first unit,
   wherein the controller is further configured to determine one of the detected wireless communication networks as the second wireless communication network, when at least two wireless communication networks are detected as candidate destinations with a same destination priority order.

2. The communication terminal device according to claim 1, wherein, the controller is further configured to:
   control the power supply unit to start providing power to the second unit to perform handover from the first wireless communication network to the second wireless communication network,
   when the second unit corresponding to the second wireless communication network consumes equal or less power than the first unit corresponding to the first wireless communication network, and
   when a set value of transmission power of a transmitter of the first unit becomes larger than a temporary threshold.

3. The communication terminal device according to claim 1, wherein
   the detection order comprises a destination priority order; and
   the controller is further configured to control the power supply unit to start providing power to the second unit to perform handover from the first wireless communication network to the second wireless communication network,
   when the second unit corresponding to the second wireless communication network consumes more power than the first unit corresponding to the first wireless communication network, and when handover within the first communication network is not possible.

4. The communication terminal device according to claim 1, wherein:
   the detection order comprises a destination priority order, and
   the controller is further configured to control the power supply unit to provide power to the wireless communication units to detect the second wireless communication network.

5. The communication terminal device according to claim 4, wherein the detection order further comprises a power consumption order based on a power consumption in the transmitter of each of the wireless communication units.

6. A method for performing handover from one wireless communication network to another, comprising:
   establishing a communication with a first wireless communication network;
   detecting occurrence of a handover factor during the communication with the first wireless communication network;
   detecting a second wireless communication network from one or more wireless communication networks different from the first wireless communication network based on a detection order of the one or more wireless communication networks, when occurrence of the handover factor is detected, wherein the detection order comprises a power consumption order based on a power consumption of a transmitter in each of a plurality of wireless communication units, and the detecting of the second wireless communication network is based on the power consumption order;
   sequentially specifying wireless communication networks based on the power consumption order and supplying power to a corresponding wireless communication unit for a predetermined time period;
   comparing a first power consumption value associated with communicating with the first wireless communication network to a second power consumption value associated with communicating with the second wireless communication network;

performing handover from the first wireless communication network to the second wireless communication network, when the second power consumption value is not higher than the first power consumption value; and performing handover from a first base station in the first wireless communication network to a second base station in the first wireless communication network when the second power consumption value is higher than the first power consumption value, wherein the second wireless communication network is detected when at least two wireless communication networks are detected as candidate destinations with a same destination priority order.

7. The method according to claim 6, further comprising:

stopping providing power to terminal device receivers corresponding to each of the one or more wireless communication networks except the first wireless communication network when communicating with the first wireless communication network; and providing power to each terminal device receiver corresponding to each of the one or more wireless communication networks for a predetermined period of time when detecting the second wireless communication network.

8. The method according to claim 7, wherein the second wireless communication network is determined based on the power consumption order.

9. The method according to claim 8, further comprising determining when a set value of transmission power for communicating with the first wireless communication network becomes larger than a temporary threshold, when a communication with the second wireless communication network consumes more power than a communication with the first wireless communication network.

10. The method according to claim 8, further comprising starting performing handover when the set value becomes larger than the temporary threshold.

11. The method according to claim 9, further comprising maintaining communication with the first wireless communication network when the set value does not become larger than the temporary threshold.

12. The method according to claim 11, further comprising stopping performing handover when the handover factor is resolved.

13. The method according to claim 12, further comprising determining whether handover within the first wireless communication network is possible when the handover factor is resolved, and when a communication with the second wireless communication network consumes more power than the communication with the first wireless communication network.

14. The method according to claim 6, wherein the detection order comprises a destination priority order.

15. The method according to claim 14, wherein the second wireless communication network is determined based on the destination priority order.

16. The method according to claim 14 further comprising: performing a handover to the second communication network even when second power consumption value is higher than the first power consumption value when handover from the first base station to the second base station within the first communication network is not possible.

* * * * *